April 29, 1958   J. N. HALL, JR   2,832,490
LIFT TRUCK
Filed Nov. 7, 1955

INVENTOR.
JAMES N. HALL JR
BY Oscar H. Spencer
ATTORNEY

United States Patent Office 2,832,490
Patented Apr. 29, 1958

2,832,490

LIFT TRUCK

James N. Hall, Jr., Downey, Calif., assignor to Pittsburgh Plate Glass Company, a corporation of Pennsylvania Application November 7, 1955, Serial No. 545,391

8 Claims. (Cl. 214—654)

This invention relates to a lift truck and more especially relates to the platform type employed to roll under a load-conveying skid to lift and transport it.

In the manufacture of plate and window glass it is necessary to move or transport sheets of plate or window glass from one part of the factory to the other for storage or for further processing, such as the lamination with or the bonding to a thermoplastic interlayer in the manufacture of safety glass. To store and transport the sheets of plate glass or window glass there had been developed supporting racks or load-carrying skids that are referred to in the industry as A-frame racks or bucks. The A-frame rack has a base that is spaced from a floor by legs. The base has mounted thereon a pair of supporting frames that are inclined toward one another and are joined at the top as well as at intermediate heights by reenforcing cross members. The base or platform of the rack has cross rails or beams at the ends. The glass sheets are stacked on the platform and rest against one of the two inclined racks. To move the A-frame rack with the glass sheets mounted thereon a lift truck having a platform or the like is used. The platform of the truck is moved under the base of the A-frame rack, until the end bottom cross beam abuts a stop plate on the platform. Because of the height and the great weight of the rack loaded with sheets of glass and because the glass sheets are not ordinarily positioned or clamped too rigidly on the A-frame rack, the platform-type lift truck heretofore used in the transportation of the A-frame rack would not prevent it from shifting or sliding on the platform. The movement of the rack would shift and jar the glass sheets and this would damage the glass sheets.

It is an object of the present invention to provide a lift truck for transporting an A-frame rack in which the rack is securely mounted on the platform of the lift truck to prevent shifting or movement of the rack relative to the platform.

This and other objects of the present invention will be apparent to one skilled in the art from the following description of the preferred embodiment of the lift truck of the invention when taken in conjunction with the drawing in which.

Figure 1:
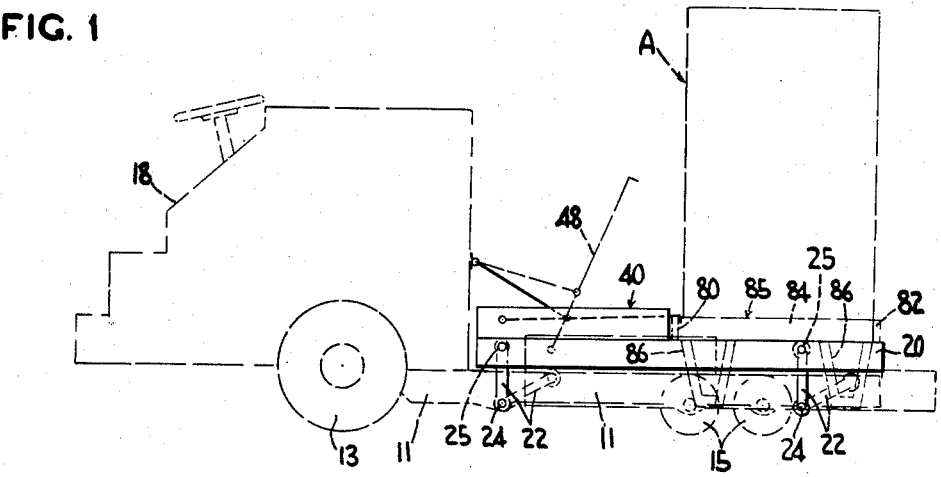
Fig. 1 is a side elevation, chiefly diagrammatic, showing in full lines the platform of the truck in the raised position and in dotted lines the position of the platform in the lowered position and also showing diagrammatically an A-frame rack mounted on the platform in the raised position.
Figure 2:
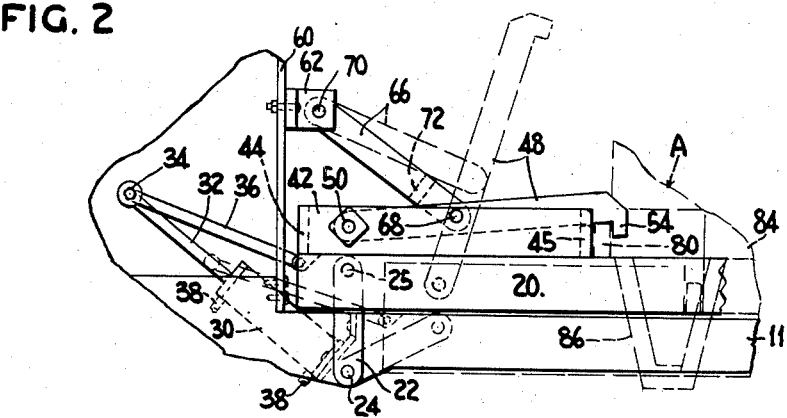
Fig. 2 is a fragmentary side elevation of the lift truck of the present invention and showing the securing or clamping of an end bottom beam of an A-frame rack.
Figure 3:
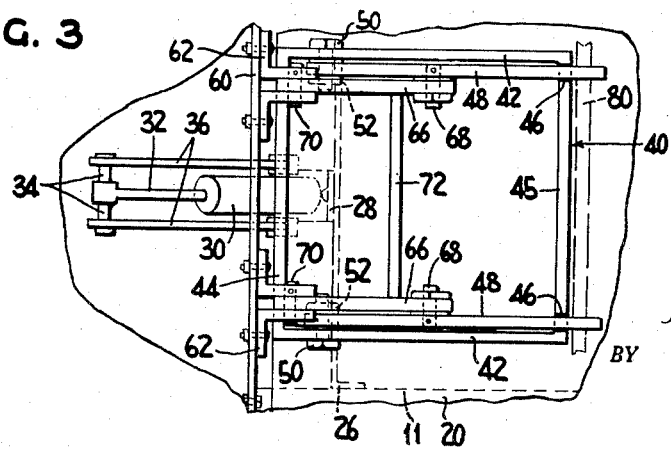
Fig. 3 is a fragmentary top plan view of the lift truck showing the arrangement of the parts shown in the side elevation in Fig. 2.

The preferred embodiment of the lift truck of the invention, as seen in Figs. 1, 2 and 3, is a modification of the Elwell-Parker type GEP–10 low-lift platform truck. The truck in the drawing has a frame 11 on which are mounted a pair of driving wheels 13 and two pairs of trail wheels 15. The drive wheels are driven by a motor (not shown) also mounted on the frame 11 within housing 18.

A platform 20 is mounted on the right end (as viewed in Fig. 1) of frame 11 to be raised and lowered relative to frame 11 by means of two pairs of linking members 22 pivotally connected to frame 11 and platform 20 by means of stud shafts 24 and 25 mounted on frame 11 and platform 20, respectively. A transverse plate 26 is welded to frame 11. A support bracket 28 is bolted to transverse plate 26. A double-acting hydraulic cylinder 30 having a piston rod 32 is bolted to bracket 28. Rod 32 is provided at the free end with trunnions 34 on which are pivotally mounted linking members 36. Hydraulic cylinder 30 has its rod 32 moved in and out of cylinder 30 by movement of oil in and out of cylinder 30 by means of pipes 38. The flow of oil into the appropriate chamber of cylinder 30 and out of the other chamber is controlled in the usual manner using a conventional four-way valve (not shown). The oil or other fluid is pumped by means of a pump (not shown) operated by the motor (not shown) that drives wheels 13.

Instead of the vertical stop plate ordinarily mounted on the platform at the left end of the platform 20, a frame generally indicated at 40 is welded on platform 20 at the left end of platform 20, as viewed in the figures. The frame 40 has a pair of vertical plates 42 extending longitudinally on the platform 20. Plates 42 are welded to platform 20. Welded to plates 42 at their ends are transverse plates 44 and 45 that are also welded to platform 20. Plate 45 is provided with two notches 46 in alignment with a pair of arms 48 pivotally mounted on plates 42 by means of bolts 50 and nuts 52. Arms 48 are provided with downturned extensions 54. In the preferred embodiment the top surface of plate 45 in the notches is in a horizontal plane above the pivotal axis of arms 48.

A vertical support 60 is bolted to frame 11. Support 60 has bolted thereon brackets 62 to which are pivotally mounted a pair of linking members 66. The other end of linking members 66 is each pivotally mounted by means of pins 68 to arms 48 at a point intermediate the pivotal mounting of arms 48 and the downturned extensions 54 of arms 48. The linking members 66 are maintained in their spaced relationship not only by the mounting on pins 70 of supporting brackets 62 but also by means of a bar 72, the ends of which are welded to the linking members 66. Pins 68 and 70 are mounted to arms 48 and brackets 62, respectively, by means of set screws.

An A-frame rack generally indicated at A is shown in Figs. 1 and 2 mounted on platform 20 with the latter in the raised position. The rack A has at the bottom a pair of end or cross rails or beams 80 and 82. The bottom cross rails 80 and 82 are joined to longitudinal or side rails or beams 84 to form with cross rails 80 and 82 a base 85. Mounted to base 85 are legs 86.

The rack A initially rests on the floor of the building by means of legs 86. The lift truck can be moved into position to slide the right-hand portion of frame 11 as well as platform 20, the latter being in the down position, underneath the base 85 of frame A. The truck is moved until cross beam 80 abuts plate 45 of frame 40. The truck and its platform 20 are now in position to lift or raise frame A. This is accomplished by moving the end of piston rod 32 away from hydraulic cylinder 30 by pumping oil into the bottom chamber and removing oil from the top chamber of hydraulic cylinder 30 through pipes 38. This moves trunnions 34 upwardly thereby pulling linking members 36 to the left and upwardly as viewed in Fig. 2. This movement of linking members 36 will pull platform 20 to the left. At the same time platform 20 will move upwardly because of the rocking-type of linkage of mounting platform 20 to frame 11 by means of linking members 22. Upward movement of platform 20 results in upward movement, as well as movement to the left, of the bolts 50 and thus the pivotal axis of arms 48. Arms 48 will be lowered by this movement because of linking members 66 pivotally connected to arms 48. The raising of platform 20 moves the free end of arms 48 downwardly until arms 48 move into notches 46 of plate 45 and arms 48 engage the top surface of end cross beam 80. In this position the downwardly turned extensions 54 of arms 48 are on the side of beam 80 opposite to the side of beam 80 that is abutted by plate 45. Thus it is seen that, when platform 20 is raised to lift rack A so that its legs 86 are lifted from the ground, arms 48 are lowered until they cooperate with plate 45 to provide a clamping action upon cross beam 80 to secure frame A on platform 20. After platform 20 has been raised to this point the truck can move frame A to the desired new position without sliding, tilting or slipping of frame A relative to platform 20. Of course, when platform 20 is lowered by moving rod 32 downwardly, arms 48 automatically raise with movement of bolts 50 and platform 20 down and to the right.

The notches 46 insure engagement of extensions 54 of arms 48 with beam 80 when the height of beam 80 varies for one rack A to another within a range that is dependent upon the height of plate 45 and the depth of notches 46.

The foregoing description of the preferred embodiment has been presented for purposes of illustration only. Various modifications will be apparent to one skilled in the art and these modifications come within the scope of the invention which is limited only by the claims which follow.

I claim:

1. A lift truck comprising a wheel-supported frame, a support mounted on and extending upwardly from the frame, a platform mounted on the frame to move upwardly and downwardly relative to the frame and the support, a stop means mounted on the platform, an arm pivotally mounted on the platform about a transverse axis between the stop means and the support, said arm having a downwardly turned extension distal the pivotal axis, and a linking member pivotally connected to the support and to the arm intermediate the free end and the pivotal axis of the arm, said linking member being adapted to move said arm downwardly with upward movement of said platform relative to said frame and said support and said arm in the down position extending beyond said stop means.

2. A lift truck comprising a wheel-supported frame, a support mounted on and extending upwardly from the frame, a platform mounted on the frame adjacent the support to move upwardly and downwardly relative to the frame and the support, means for moving the platform relative to the frame, a transverse plate mounted on the platform near the end adjacent the support to provide a stop means, a pair of arms spaced apart and pivotally mounted on the platform about a transverse axis between the plate and the support, each of said arms having a downwardly turned extension at the free end, and a linking means pivotally connected to the support and to each of the arms intermediate the free end and the pivotal axis of the arm, and said arms in the down position extending beyond said transverse plate.

3. A lift truck comprising a wheel-supported frame, a platform, rocking-link means connected to the frame and the platform and mounting the platform on the frame for movement of the platform upwardly and downwardly relative to the frame, means for moving the platform relative to the frame, a support rigidly mounted on and extending upwardly from the frame adjacent the platform, a transverse plate mounted on the platform to provide a stop means, a pair of spaced-apart longitudinal plates mounted on the platform between the transverse plate and the support, a pair of arms pivotally mounted on the pair of longitudinal plates about a transverse axis, each of said arms having a downwardly turned extension at the free end, and a linking means pivotally connected to the support and to each of the arms intermediate the free end and the pivotal axis of the arm, and said arms in the down position extending beyond said transverse plate.

4. The lift truck of claim 3 wherein the transverse plate has a pair of notches at the top surface in alignment with the pair of arms.

5. The lift truck of claim 3 wherein the downwardly turned extension of each of said arms provides with the arm in the down position a substantially parallel surface spaced apart from and opposing a surface of the transverse plate, each of said arms in the down position extending beyond said transverse plate.

6. The lift truck of claim 5 wherein the transverse plate has a pair of notches in the top surface in alignment with said arms.

7. A platform subassembly for a lift truck comprising a platform, a transverse plate rigidly mounted on the platform near one end, a pair of spaced-apart longitudinal plates rigidly mounted on the platform between the transverse plate and said end, a pair of arms, each arm being pivotally mounted on one of the longitudinal plates about a transverse axis and each arm having a downwardly turned extension at the free end, and a linking means pivotally connected to the arms intermediate the free end and the pivotal axis of each arm, said linking means being adapted to be pivotally mounted at its free end about a fixed axis whereby said linking means moves said arms downwardly with upward movement of said platform and said arms in the down position extending across and beyond said transverse plate.

8. A lift truck comprising a wheel-supported frame, a support mounted on and extending upwardly from the frame, a platform mounted on the frame to move upwardly and downwardly relative to the frame and the support, an arm pivotally mounted on the platform about a transverse axis, said arm having a downwardly turned extension distal the pivotal axis, and a linking member pivotally connected to the support and to the arm intermediate the free end and the pivotal axis of the arm and being adapted to move said arm downwardly with upward movement of said platform relative to said frame and said support.

References Cited in the file of this patent

UNITED STATES PATENTS

| | | |
|---|---|---|
| 1,174,580 | Irrgang | Mar. 7, 1916 |
| 1,763,351 | Gfrorer | June 10, 1930 |
| 1,953,056 | Olen | Mar. 27, 1934 |
| 2,545,021 | Coupland et al. | Mar. 13, 1951 |
| 2,583,114 | Monteith | Jan. 22, 1952 |
| 2,584,870 | Hally | Feb. 5, 1952 |
| 2,633,260 | Sutherland | Mar. 31, 1953 |
| 2,651,428 | Dickson | Sept. 8, 1953 |
| 2,713,433 | Gardner et al. | July 19, 1955 |
| 2,772,800 | Brady | Dec. 4, 1956 |